Aug. 15, 1944.　　　K. L. HAYDEN　　　2,355,915

FROZEN CONFECTION

Filed April 12, 1940

WITNESSES

INVENTOR

Kenneth L. Hayden

Patented Aug. 15, 1944

2,355,915

UNITED STATES PATENT OFFICE 2,355,915

FROZEN CONFECTION

Kenneth L. Hayden, Brooklyn, N. Y.

Application April 12, 1940, Serial No. 329,240

2 Claims. (Cl. 99—137)

This invention relates to confectionery products, and more particularly has reference to a pre-formed edible container or receptacle, filled with a fluid confectionary substance; which is thereafter subjected to refrigeration, to become thereby, a frozen confectionery product.

An object of the invention is to devise a frozen confection requiring comparatively fewer operations in the manufacture thereof, than are required by conventional practices in the production of the so-called coated frozen confections, such as for example, the ice cream sucker, commonly termed the "Popsickle," the coated "Eskimo Pie," and other frozen confections trademarked under similar names.

Another object is to provide an edible form sustaining shell or tubular receptacle composed of a thin wafer like waffle material, or the like, which remains open at one end, for the introduction of a relatively liquid or fluid ice cream, custard, or sherbet mixture, or combinations thereof; which can thereafter be subjected to refrigeration to obtain a novel and easily consumable frozen confection having an edible and non-flaking, non-soiling container for the protection of the frozen confectionery product.

Other objects are to provide confectionary products having relatively rigid edible containers filled with liquid ice cream, custard, or sherbet mixtures, or combinations thereof; which are subjected to refrigeration, to obtain thereby, composite and completely edible frozen confections, which are adapted to be conveniently held by the hand while being consumed.

Still other objects are to provide simple, yet convenient frozen confections that are readily suitable for mass production in the manufacture thereof, and which can be stored in cold chambers thereafter for indefinite periods of time until marketed, thus avoiding deterioration of the contents through utilization of a non-flaking, non-soggy cooked dough, paste, or the like, formed into receptacles for retaining and protecting the fluid contents until frozen, and facilitating ready handling thereof as well during and after the manufacture thereof.

Other features are to provide frozen confectionery products having a simple moulded or pre-formed edible container or receptacle filled with a fluid confection which is thereafter frozen, eliminating the multiple manufacturing operations required in the production of the so-called coated confections, such as moulding the frozen body portion of such coated confections, then subjecting the same to various cutting operations, in order to obtain suitable sizes for human consumption, which by this operation necessitates additional freezing of the cut product in order to secure the necessary hardening of the body portion for the purpose of receiving an encasement of molten covering material applied thereto by various dipping operations of the body portion, and thereafter subjecting the body portion to further freezing operations in a cold room, in order to obtain a finished frozen confectionery product.

Other novel features of the invention will become apparent from the detailed description hereinafter given, which is illustrated in the accompanying drawing forming a part of this application. It is to be clearly understood however, that the forms of the invention illustrated and described constitutes the preferred embodiments of my invention for purposes of illustration, and similar forms and constructions may be utilized without departing from the scope of the appended claims.

In the drawing similar reference characters refer to the similar parts in all of the views of which;

Figure 1:
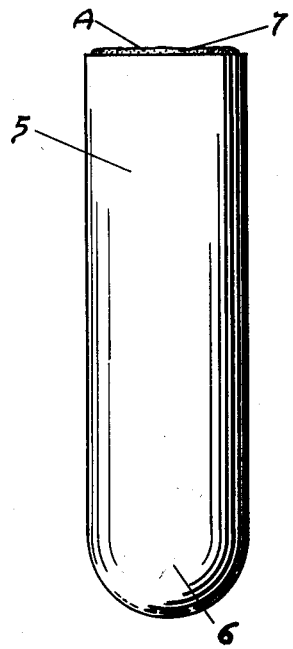
Figure 1 is a vertical elevation of the invention.
Figure 3:
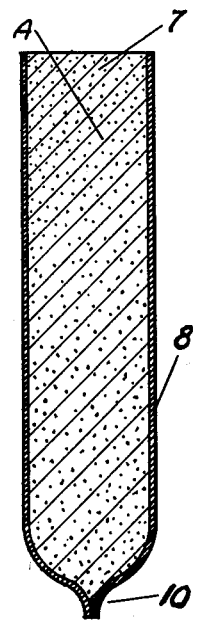
Figure 3 is a vertical sectional elevation of the modified form of invention illustrated in Figure 2.
Figure 2:
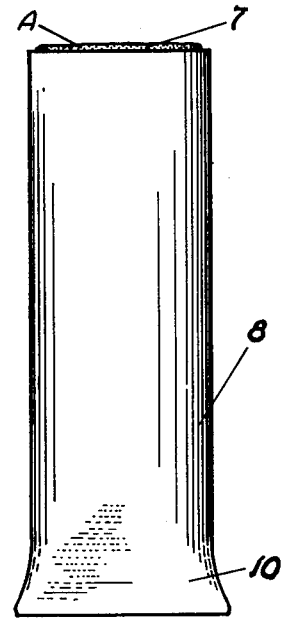
Figure 2 is a vertical elevation of a modified form of the invention.
Figure 4:
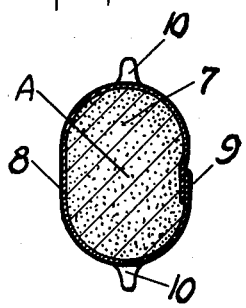
Figure 4 is a cross sectional plan view of the modified form of invention illustrated in Figures 2 and 3.

By referring to the drawing, it will be seen that a tubular shell or encasement 5 of elongated circular form is provided with the top opening 7 disposed for the introduction of a fluid confectionery mixture A, and is closed at the bottom end at 6 by suitable forming means moulding the bottom of the tube 5. This cylindrical tube composed of an edible dough, paste, or the like, is cooked in suitable moulding apparatus provided with heating elements to cook the dough and thereby form a thin wafer-like waffle material comparatively rigid and erect after the cooking operation has been completed.

These pre-formed tubes after their removal from the moulding apparatus may be then mounted within conventional supporting racks or stands adapted to receive and hold them in an upright position for the filling operations of the various fluid confectionery mixtures A desired. Within these tubular shells 5, one or more of the several fluid confectionery mixtures A is introduced at the opening 7, such as an ice cream mixture, a custard mixture, a sherbet mixture or the like, or various combinations of such mixtures and flavors as may be desired. These supporting racks or stands retaining their filled tubes are then subjected to refrigeration within a cold chamber until the fluid mixture A congeals and forms a frozen confectionery product.

A suitable waxed paper cap or bag may then be drawn over the opening 7 of the tube 5 in order to protect the enclosed frozen confection A from contamination, and to facilitate ready handling as well. The frozen tubes now covered and supported in their freezing racks or stands may be readily stored indefinitely in refrigerated storage rooms until required for consumption.

It is obviously apparent that the tubular shells or encasements 5 may comprise cooked wafer-like waffle materials of various flavors as desired to complement the various confectionery flavors A introduced within these encasements for freezing purposes.

An alternate form of edible container may be utilized in lieu of the initial moulded tube 5 illustrated and described, by preparing flat sheets of wafer like edible dough, paste, or the like, which are formed and cooked in suitable waffle irons, and which are thereafter removed and rolled into cylindrical form as at 8, with the overlapping seam 9 closing this edible tube at the joint 9. This joint 9 is provided for the purpose of permitting slight expansion of those liquid confections A which retain a large amount of water in their mixture, such as the common sherbet or ice mixtures, which expand slightly upon exposure to refrigeration, thus avoiding by the use of the joint 9, possibility of rupture of these tubes while undergoing refrigeration. The bottom 10 of the tube 8 is preferably formed by forcing the bottom edges of the tube together under pressure, thereby closing and sealing the bottom 10 by adhesion of the dough or paste material. A similar opening 7 is provided at the top of the tube 8 for introduction of the various fluid confectionery mixtures A desired, as previously described. The tube is preferably provided with a slightly oval cross sectional form, as this contour is believed to be more adaptable to the contour of the human mouth while consuming such frozen confections A.

The process and methods of supporting, filling and likewise congealing these tubes by refrigeration are obviously similar in all respects to those operations previously described for the pre-formed tubes. Similar variations in flavoring of the cooked dough or wafer paste material may be equally utilized in the production of these rolled tubes, as well as for the pre-formed tubes.

The various confectionery mixtures desired determine to a great extent, the form of edible container selected for use, in that those mixtures containing a relatively large amount of moisture content in their compounding, such as for example, the frozen ices, sherbet mixtures, etc., which thereby contain a relatively large coefficient of expansion under refrigeration, will thereby require the form of container provided with the expansion joint 9 disposed along the longitudinal axis, as illustrated and described, while those confectionery mixtures having little or no moisture content, and thereby little or no expansion under refrigeration as well, can successfully utilize the pre-formed edible container initially illustrated and described.

The term liquid or fluid confectionary mixtures as used in this specification denotes the various ice creams, ices, sherbets, or custard mixtures commonly mixed by the usual agitator in the ordinary freezer under conventional processes, which result in a fluid or liquid mass of relatively mushy consistency.

The term cold chamber, cold room, refrigerated storage room, etc., as used in this specification, denotes those chambers or rooms artificially cooled and maintained at temperatures well below freezing for purposes of freezing and hardening these confectionary products, and are commonly termed in the frozen confectionery trade as hardening rooms.

The term normal temperatures, as used in this specification, denotes the usual variations in temperature ordinarily encountered by human beings ranging from temperatures of about 45° F. to 90° F.

What is claimed is:

1. The method of producing a confectionery product comprising forming an edible hollow tube closed at one end and provided with an overlapping expansion joint longitudinally disposed thereon, filling the same with an edible liquid material and subjecting the filled tube to refrigeration to effect congelation of said liquid material and form a frozen product.

2. In combination, an edible tube closed at one end and an edible liquid material adapted to be frozen therein, the tube being provided with an expansion joint disposed to compensate the expansion of said liquid material in the freezing thereof.

KENNETH L. HAYDEN.